US009090034B2

(12) United States Patent
Fookes et al.

(10) Patent No.: US 9,090,034 B2
(45) Date of Patent: Jul. 28, 2015

(54) MANUFACTURING PROCESS FOR FORMING A CHAIR BACK (75) Inventors: Tim Fookes, Hudsonville, MI (US); Keith Shoemaker, Holland, MI (US); Pete Beyer, Hamilton, MI (US); Mark Sherman, Hudsonville, MI (US)

(73) Assignee: Haworth, Inc., Holland, MI (US)

( * ) Notice: Subject to any disclaimer, the term of this patent is extended or adjusted under 35 U.S.C. 154(b) by 470 days.

(21) Appl. No.: 13/643,113

(22) PCT Filed: Apr. 26, 2011

(86) PCT No.: PCT/US2011/033962
§ 371 (c)(1),
(2), (4) Date: Mar. 28, 2013

(87) PCT Pub. No.: WO2011/137120
PCT Pub. Date: Nov. 3, 2011

(65) Prior Publication Data
US 2013/0181372 A1    Jul. 18, 2013

Related U.S. Application Data (60) Provisional application No. 61/343,264, filed on Apr. 26, 2010.

(51) Int. Cl.
*B29C 45/16* (2006.01)
*B29D 99/00* (2010.01)
*A47C 7/44* (2006.01)
*B29L 31/44* (2006.01)

(52) U.S. Cl.
CPC .............. *B29D 99/0092* (2013.01); *A47C 7/44* (2013.01); *B29C 45/16* (2013.01); *B29L 2031/443* (2013.01)

(58) Field of Classification Search
CPC ....... B29D 99/0092; A47C 7/44; B29C 45/16
See application file for complete search history.

(56) References Cited

U.S. PATENT DOCUMENTS 8,257,642 B2 *    9/2012    Sun .............................. 264/516
2013/0313883 A1 *  11/2013  Machael et al. ......... 297/452.18

FOREIGN PATENT DOCUMENTS

EP          1900307 A1 *    3/2008

OTHER PUBLICATIONS

International Search Report in PCT Application No. PCT/US011/033962, mailed Jul. 12, 2011.*
International Preliminary Report on Patentability in PCT PCT Application No. PCT/US011/033962, issued Oct. 30, 2012.*

* cited by examiner

*Primary Examiner* — Ryan Ochylski
(74) *Attorney, Agent, or Firm* — Warner Norcross & Judd LLP (57) ABSTRACT An improved chair back is formed of a molded construction uses multiple mold shots of mold materials to develop different performance characteristics in selected areas of the chair back. The chair back has the appearance of a unitary molded panel, but is formed from multiple mold shots which preferably are performed at multiple stations on a mold tool. By providing multiple mold shots and selected materials to form different areas of the chair back, different performance characteristics are generated including the provision of a peripheral frame providing structural rigidity to the chair back, a lumbar support panel which provides localized support to the lumbar region of the chair occupant, and a thin sheet-like support panel extending between the frame and enclosing the interior region defined between the peripheral frame to provide a more flexible and pliant surface providing more comfortable contact with the occupant's back.

11 Claims, 14 Drawing Sheets

MANUFACTURING PROCESS FOR FORMING A CHAIR BACK

FIELD OF THE INVENTION

The invention relates to a chair back construction and a method for manufacturing same and more particularly, to an improved chair back and manufacturing method for producing a chair back having a molded construction throughout but formed from multiple material layers.

BACKGROUND OF THE INVENTION

In one type of conventional office chair, such chairs are provided with molded seat and back panels which are supported together by a chair frame. Typically, the seat and back panels have a unitary molded construction. Some of such chairs have been provided with tilt control mechanisms so that the back panel articulates relative to the seat panel.

In other conventional office chairs, such chairs eliminate back panels or molded panels since these have a greater rigidity, instead, the seat and back assemblies incorporate flexible or cushioned materials to support the chair occupant in an effort to improve the comfort for the user. Many different features have been implemented in these office chairs including padded seats, mesh suspension fabrics and lumbar support pad assemblies to provide additional support to the lumbar of the chair occupant.

It is an object of the invention to provide an improved construction for chairs having molded seat and/or back panels.

The invention relates to an improved chair back which is formed of a molded construction that substantially differs from known chair backs using a single molded material that provides a uniform, relatively rigid back construction which unitary back construction can be undesirable. However, the chair back of the invention uses multiple mold shots of mold materials to develop different performance characteristics in different areas of the chair back.

In particular, the chair back has a generally rectangular shape and integrally includes two, downwardly projecting uprights which are configured to pivotally connect to a chair base. The uprights rigidly support the chair back along the opposite left and right side edges thereof. The chair back further comprises a sheet-like support panel extending between the uprights at the side edges, which is vertically enlarged and configured to support the chair back of the occupant. To define different performance characteristics in the chair back, the chair back has the appearance of a unitary molded panel, but is formed from multiple mold shots which preferably are performed at multiple stations on a mold tool.

In this regard, a first mold shot is performed to construct right and left structural components, preferably formed as generally L-shaped uprights that are sufficiently rigid so as to pivotally connect to the chair base. These left and right uprights provide significant structural rigidity to the left and right sides of the chair back.

In the second mold shot, the left and right uprights are overmolded with a second material to further build up another layer on the left and right sides of a back frame to form vertical or upright frame sections as well as form upper and lower cross members. This second mold shot generally forms an annular frame for the chair back that is defined by the overmolded uprights and the integrated cross members which surround an open interior of the chair back so as to define the visual appearance of an annular or peripheral back frame.

Preferably, the second mold shot also includes the formation of an intermediate web extending crosswise between the upright frame members to form a lumbar support structure or support pad which is located in the open interior and is spaced vertically from the upper and lower cross members or frame sections. The upright frame sections and horizontal cross members have a greater thickness and are less flexible so as to support loads on the chair back generated by the chair occupant.

After the second shot is completed, third and fourth mold shots are performed, preferably at the same time, although the shots are considered to be separate since they form different structures of the chair back. As such, the third and fourth mold shots also may be performed sequentially.

More particularly, the material for shot three is the same as the mold material for shot number two to ensure chemical bonding with the material of the second mold shot. The third shot forms an encapsulating wall around the vertical and horizontal frame sections to define the final, finished surfaces for these structures. The inner boundary of the third shot does not extend inwardly beyond the peripheral back frame into the interior region of the back which interior region would remain open and only the intermediate web structure. However, the fourth shot encloses this interior region as discussed below.

In particular, the fourth shot forms a thin sheet in the interior region extending from the inner boundary of the third shot encapsulating the vertical and horizontal frame structures. The fourth shot essentially defines a relatively thin, sheet-like suspension structure or interior panel that encloses the open interior, encapsulates the intermediate web and provides a support region which has greater flexibility in comparison to the frame structure.

By providing multiple mold shots to form different areas of the chair back, different performance characteristics are generated including the provision of a peripheral frame providing structural rigidity to the chair back, a lumbar support panel which uses the intermediate web to provide localized support to the lumbar region of the chair occupant, and a thin sheet-like panel extending between the frame and enclosing the interior region defined between the peripheral frame to provide a more flexible and pliant surface in contact with the occupant's back.

The invention relates to the chair structure itself as well as the method for constructing same.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
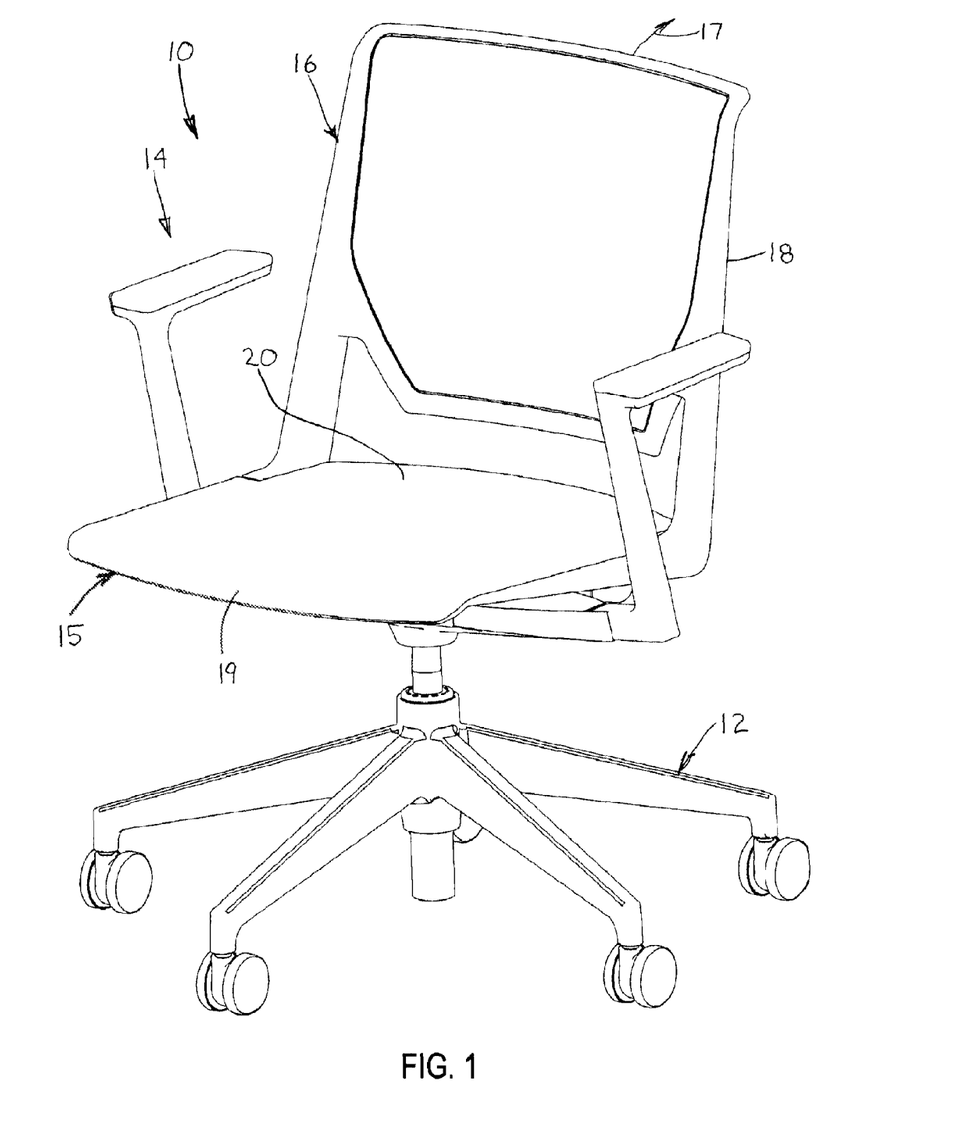
FIG. 1 is a perspective view of a chair of the invention.
Figure 2:
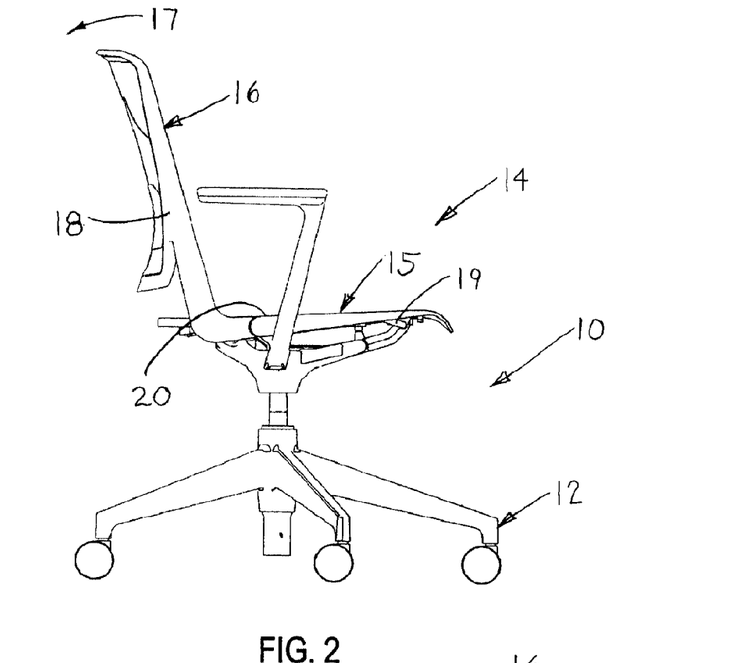
FIG. 2 is a side view thereof.
Figure 3:
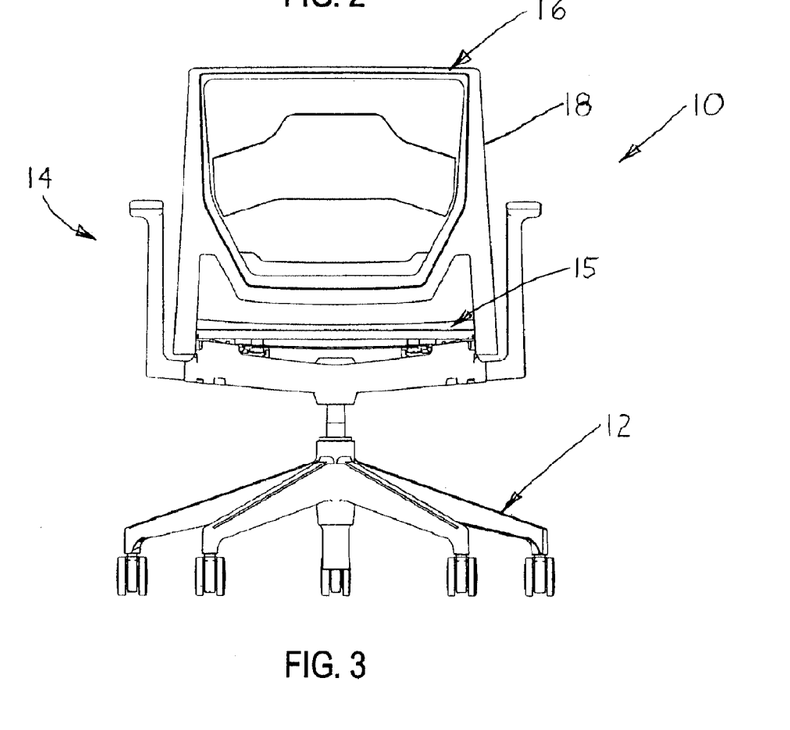
FIG. 3 is a back view thereof.

Referring to FIGS. 1-3, a chair 10 comprises a main chair frame or base 12 which supports a seat-back assembly 14 thereon. The seat-back assembly 14 comprises a seat assembly 15 and a back assembly 16. The back assembly 16 is pivotally supported on the chair frame 12 to permit rearward tilting of the back assembly in the direction of reference arrow 17. The invention relates to an improved chair back 18 which is formed of a multi-shot molded construction that substantially differs from known chair backs using a single molded material. The chair back 18 of the invention uses multiple mold shots of mold materials to develop different performance characteristics in different areas of the chair back 18.

More particularly as to the chair 10, the seat assembly 15 has a front portion 19 which is pivotally connected to the main frame 12 and has a rear seat portion 20 which is pivotally connected to the back frame 16. During rearward tilting of the back assembly 16, the interconnection with the rear seat portion 20 causes the seat to tilt rearwardly.

As such, rearward displacement of the back assembly 16 in the direction of arrow 17 by a chair occupant also causes lifting of the rear seat portion 20 which thereby acts against the weight of the chair occupant. Hence, while the chair occupant will be pushing rearwardly on the back assembly 16, the weight of the chair occupant acting downwardly on the rear seat portion 20 also resists this rearward displacement of the back assembly 16 to thereby balance some of the rearwardly directed loads generated by the occupant. One general construction of a chair of this type is disclosed in PCT Patent Application No. PCT/US2009/002729, published as WO 2009/134451, the disclosure of which is incorporated herein by reference in its entirety. It will be understood that the chair back 18 can be adapted to a variety of chair mechanism to effect rearward tilting of the chair back 18.

Figure 4:
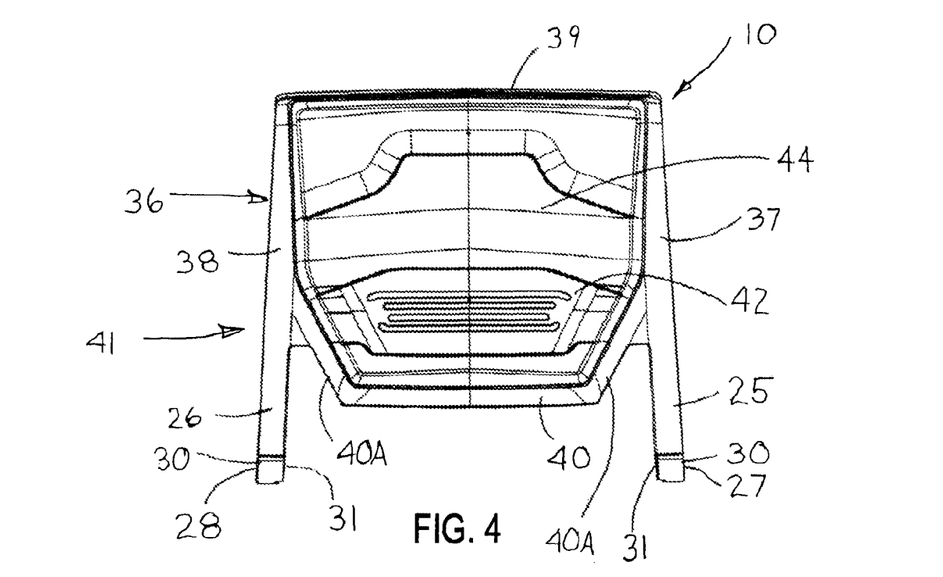
FIG. 4 is a back view of a chair back of the invention.
Figure 5:
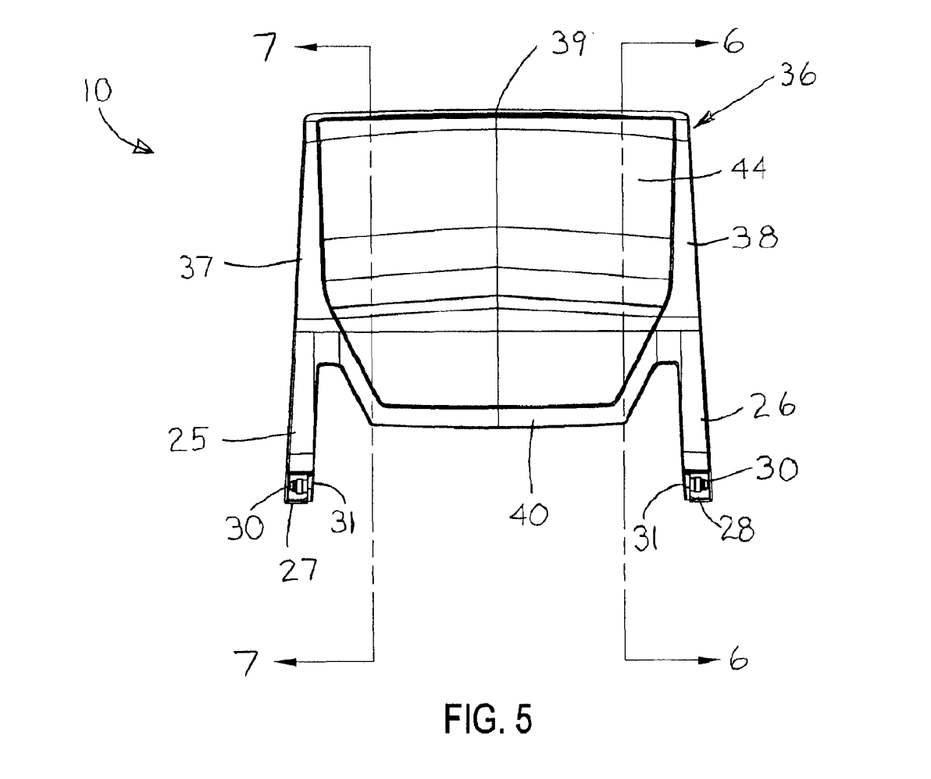
FIG. 5 is a front view thereof.

Referring to FIGS. 4 and 5, the chair back 18 has a generally rectangular shape and integrally includes two, downwardly projecting structural columns or uprights 25 and 26 which support the upper frame structure of the chair back 18. The uprights 25 and 26 have connector legs 27 and 28 projecting forwardly therefrom which are configured to pivotally connect to the chair base 12 and the rear seat portion 20 so that the chair back 18 operatively connects to the seat assembly 15 and functions similar to the back disclosed in the '729 PCT application. It will be understood the uprights 25 and 26 and the connector legs 27 and 28 are formed identically as mirror images of each other, such that the discussion may be directed to one side or the other of the chair back 18 which discussion will apply equally to other side thereof.

Figure 8:
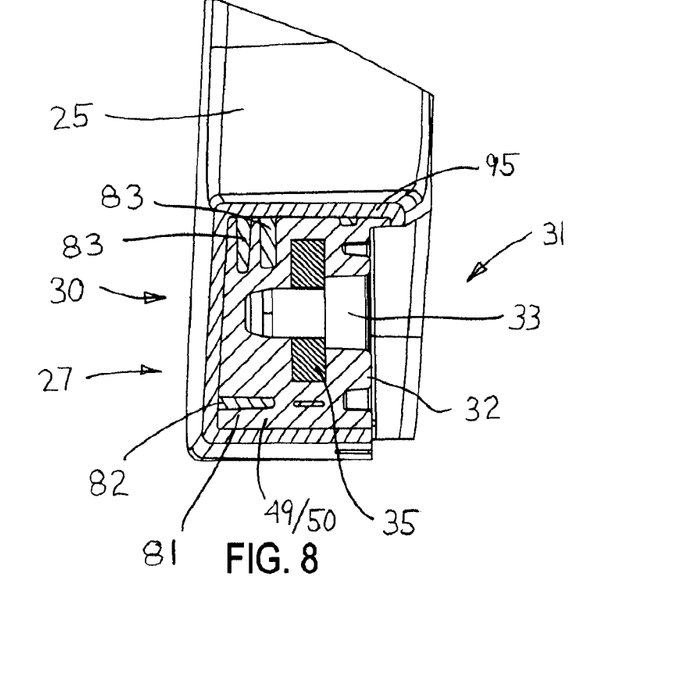
FIG. 8 is a front cross sectional view of one connector leg of a left internal upright of the chair back formed after a first mold shot, the right upright being a mirror image thereof.
Figure 9:
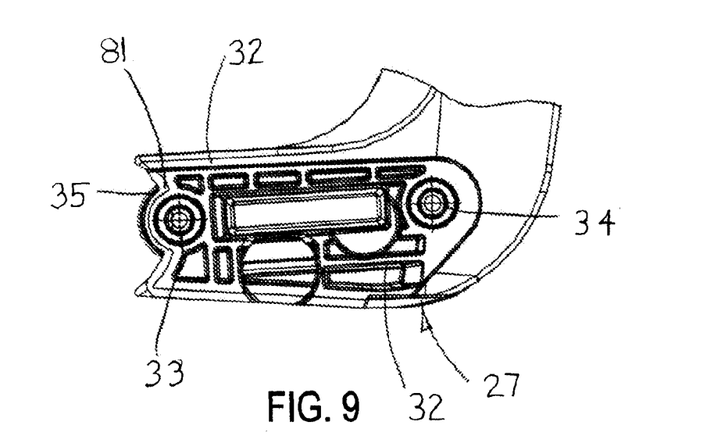
FIG. 9 is an interior side view of the left upright, the right upright being a mirror image thereof.

Referring to FIGS. 8 and 9, the connector legs 27 and 28 have an outer side 30, and an interior side 31 wherein the interior side 31 is formed with strengthening ribs 32 in a desired pattern. The interior side 31 includes a pair of connector bores 33 and 34 which receives fasteners for pivotally connecting the connector legs 27 and 28 to the base 12 and seat assembly 15. This allows for rearward tilting of the chair back 18. As such, it will be understood that these pivot connectors result in the connector legs 27 and 28 being subject to significant loads transmitted between the chair back 18 to the seat assembly 15. To accommodate such loads, the connector legs 27 and 28 each include reinforcement insert or plate 35 which is formed of a structurally strong material such as steel or other suitable materials having adequate strength to accommodate the chair loads.

The uprights 25 and 26 extend upwardly to rigidly support a frame structure 36 of the chair back 18 that is defined by opposite left and right vertical or upright frame sections 37 and 38 and top and bottom cross members or sections 39 and 40. The mid-section 41 of the chair back 18 preferably includes an intermediate web 42 (best seen in FIG. 4) extending crosswise between the upright frame members 37 and 38 to form a lumbar support structure or support pad.

The chair back further comprises a sheet-like support panel 44 extending between the upright frame sections 37 and 38 at the side edges, which support panel 44 is vertically enlarged and configured to support the chair back of the occupant. To define different performance characteristics in the chair back, the chair back has the appearance of a unitary molded panel, but is formed from multiple mold shots as will be described hereinafter.

Figures 10, 11:
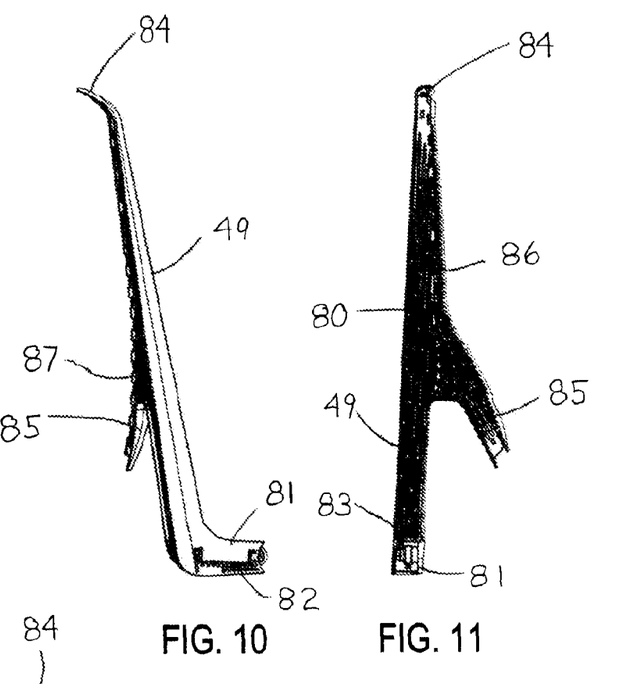
FIG. 10 is a left side view of a left side internal upright.
FIG. 11 is a front view thereof.
Figure 12:
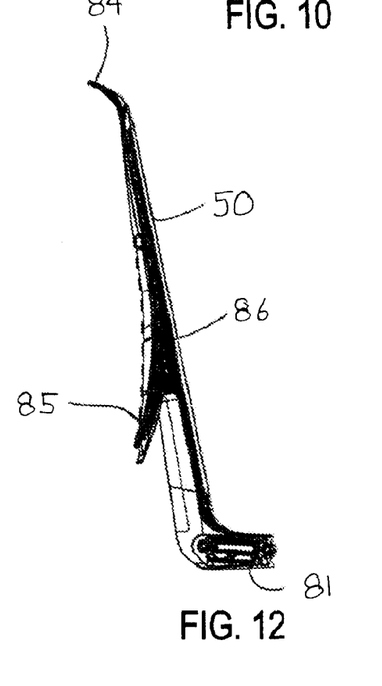
FIG. 12 is an interior side view of a right internal upright.
Figure 13:
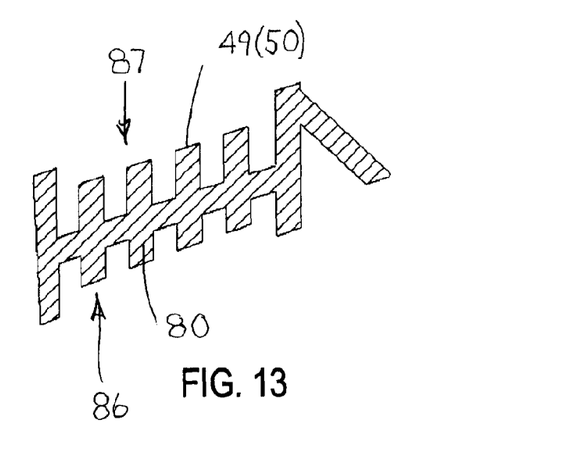
FIG. 13 is a top cross sectional view of the upright of FIG. 11.
Figure 14:
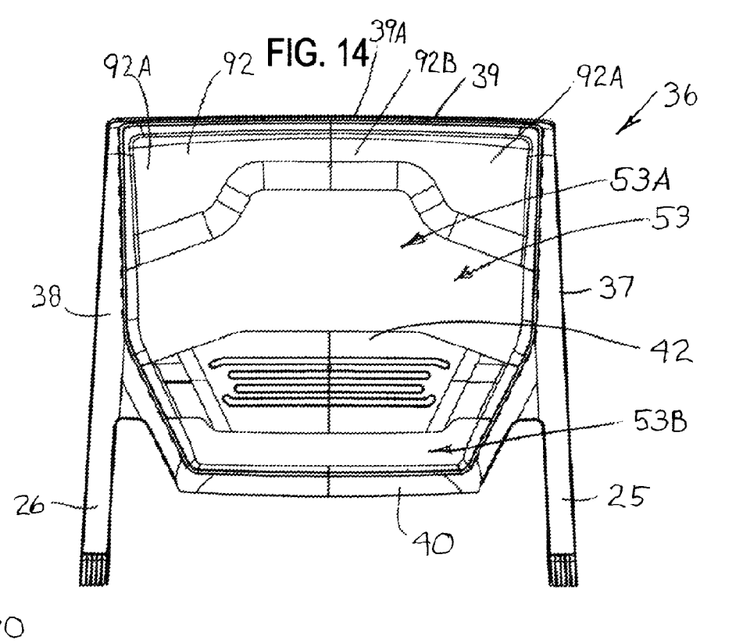
FIG. 14 is a rear view of the chair back construction after a second mold shot forming a back frame structure.
Figure 15:
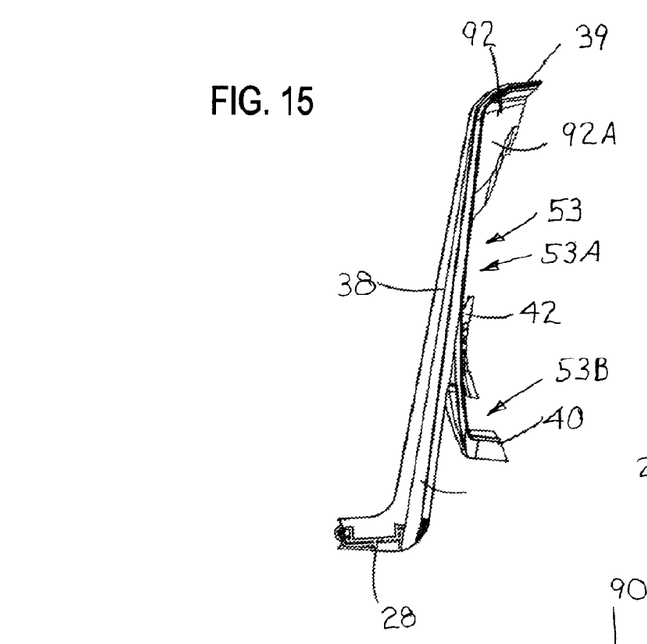
FIG. 15 is a right side view thereof.
Figure 16:
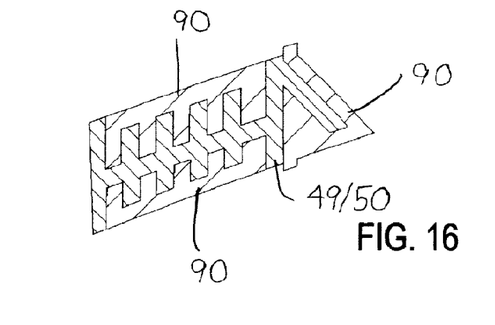
FIG. 16 is a top cross sectional view after the second mold shot.
Figure 17:
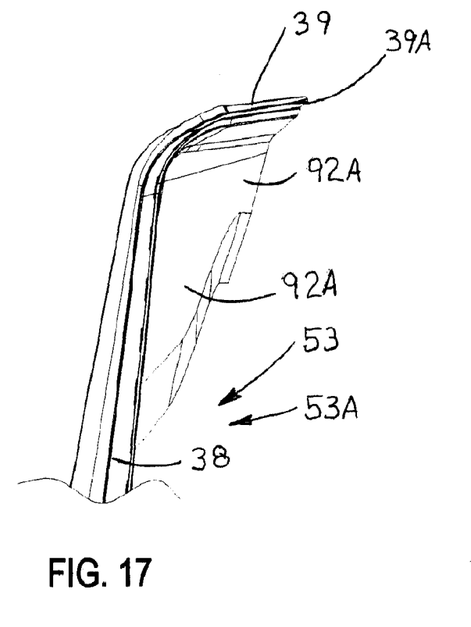
FIG. 17 is an enlarged partial right side view of the top edge section of the back frame structure.
Figure 18:
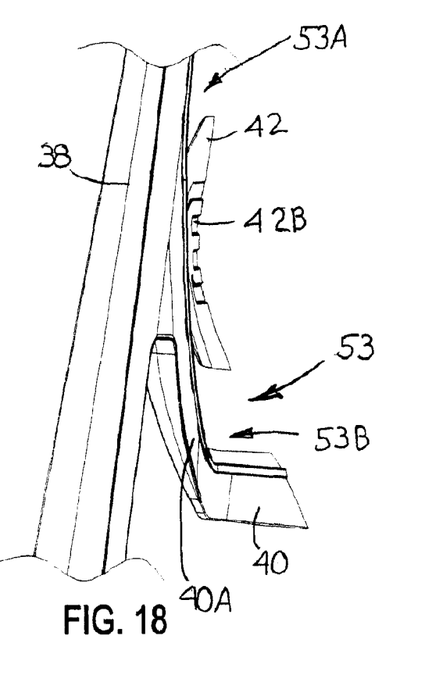
FIG. 18 is an enlarged partial right side view of a mid-section of the back frame structure.
Figure 19:
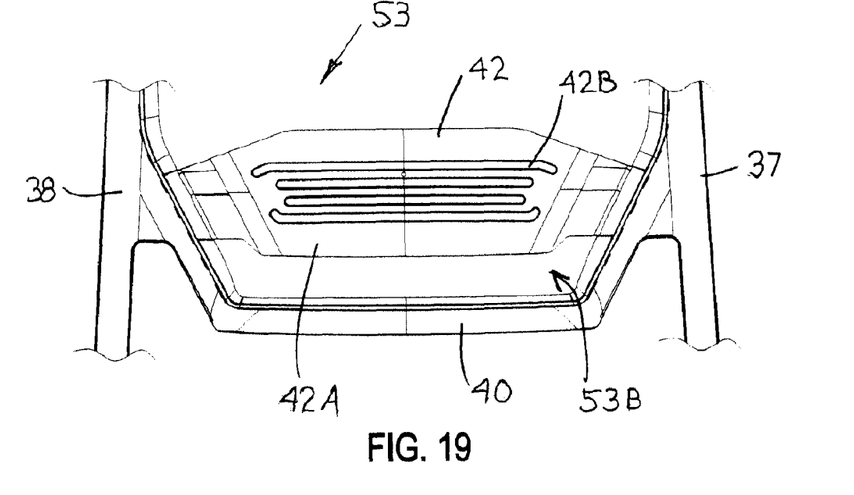
FIG. 19 is a front view thereof.
Figure 20:
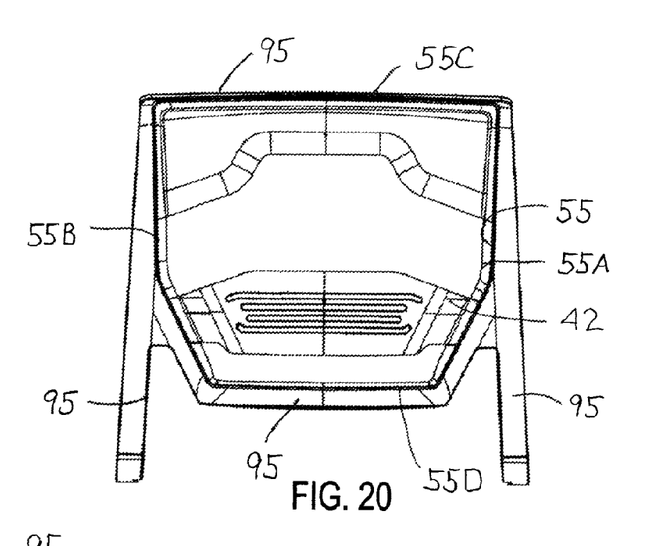
FIG. 20 is a rear view of the back structure after a third mold shot.
Figure 21:
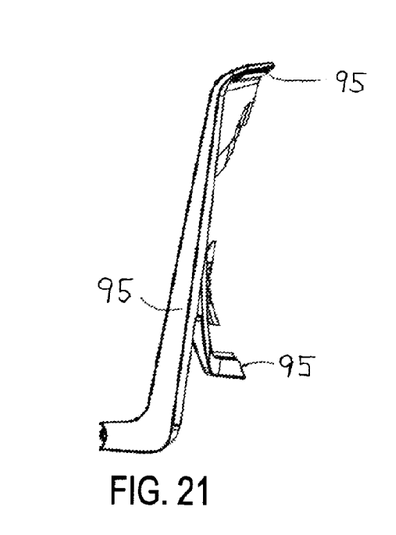
FIG. 21 is a right side view thereof.
Figure 22:
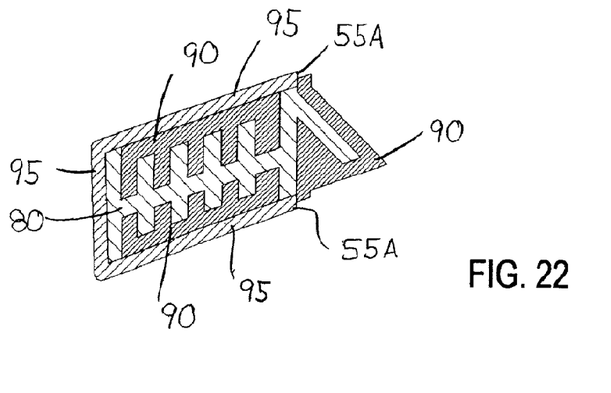
FIG. 22 is a top cross sectional view thereof.
Figure 23:
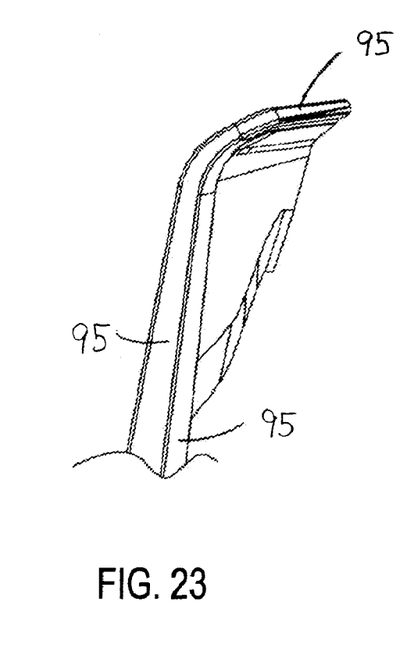
FIG. 23 is an enlarged partial side view of the top edge section with the third mold shot.
Figure 24:
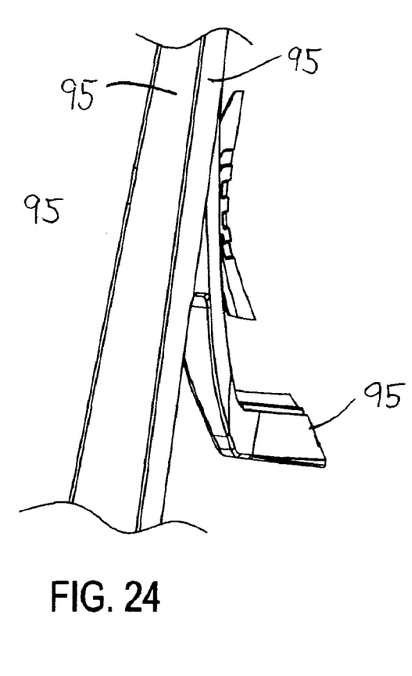
FIG. 24 is a partial side view of the mid-section with the third mold shot.
Figure 25:
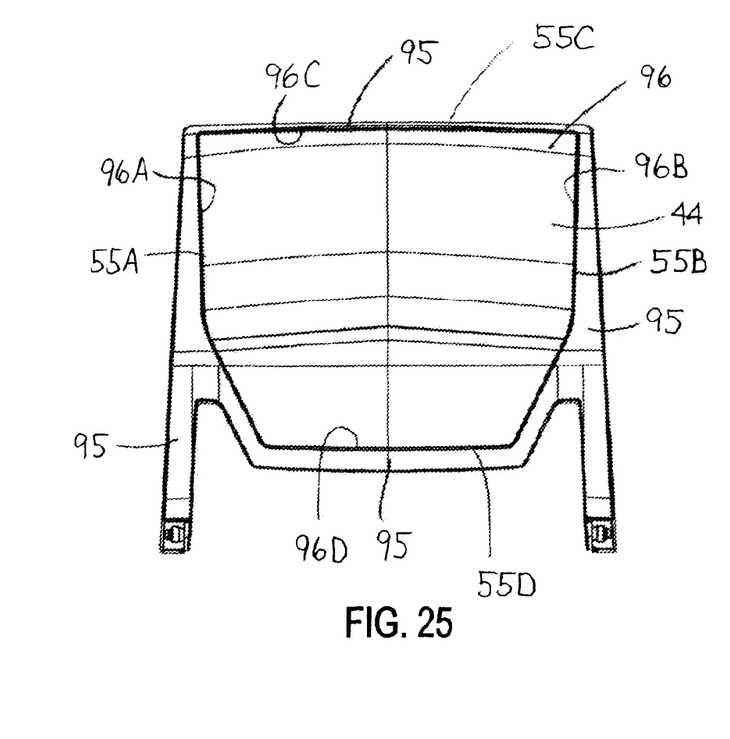
FIG. 25 is a front view of the completed chair back after a fourth mold shot.
Figure 26:
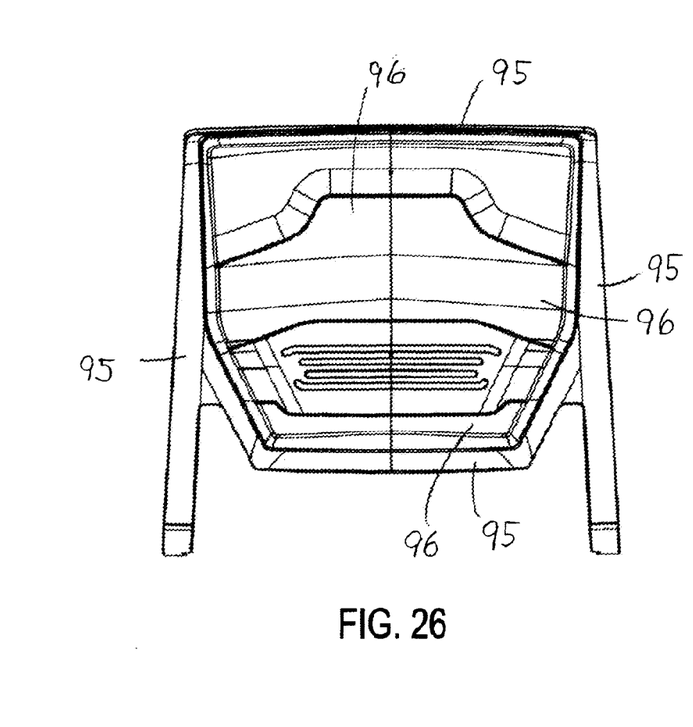
FIG. 26 is a back view of the completed chair back.
Figure 27:
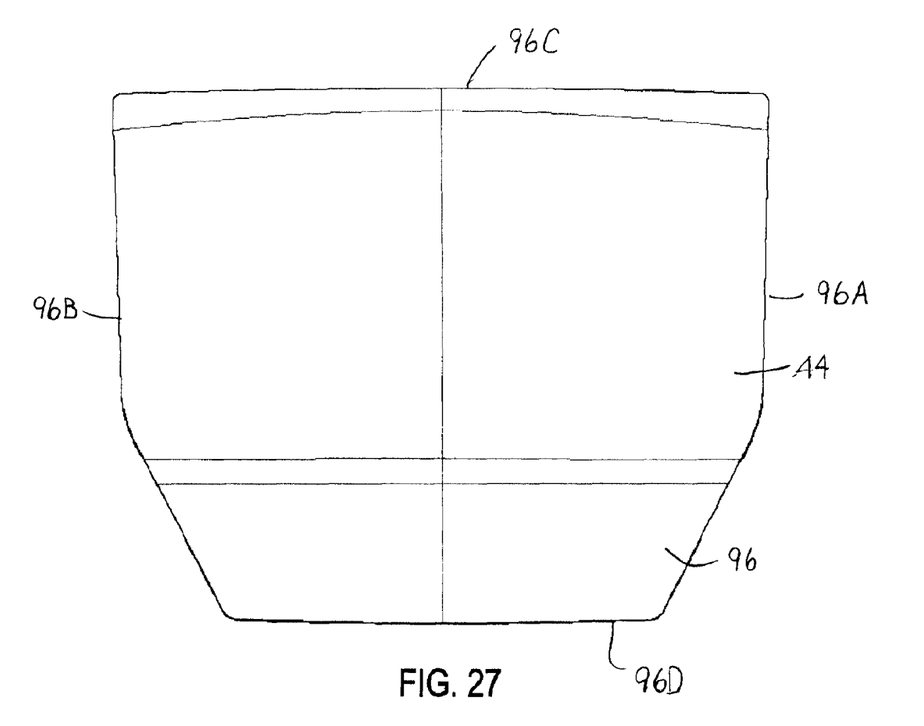
FIG. 27 is a front view showing the extent of a support panel formed by the fourth mold shot.
Figure 28:
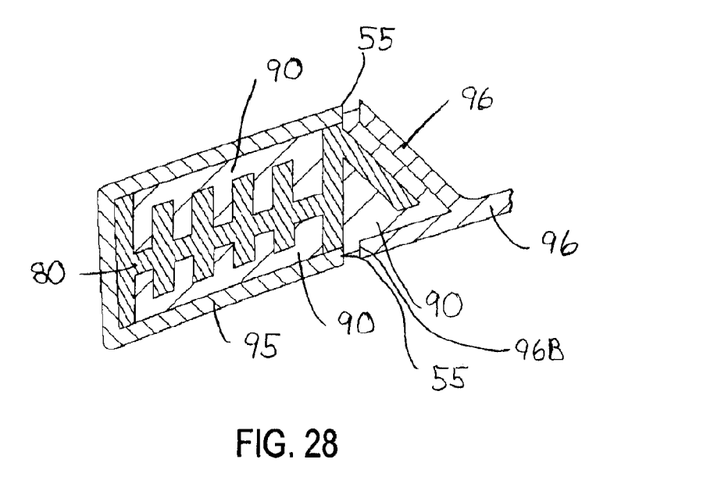
FIG. 28 is a top cross sectional view of the chair back after the third and fourth mold shots.

Generally, a first mold shot (FIGS. 10-13) is performed to construct right and left structural components, preferably formed as generally L-shaped upright core members 49 and 50 (FIGS. 10-12) that are sufficiently rigid so as to support the reinforcement insert 35 and pivotally connect to the chair base 12. These left and right core members 49 and 50 provide significant structural rigidity to the left and right sides of the chair back 18.

In the second mold shot (FIGS. 14-19), the left and right uprights 25 and 26 are further built up by overmolding the core members 49 and 50 with a second material during a second mold shot. The second mold shot also further builds up another layer on the left and right sides of the back frame 36 to further define the vertical or upright frame sections 37 and 38 as well as form the upper and lower cross members 39 and 40. This second mold shot generally forms the annular frame 36 for the chair back 18 that is defined by the overmolded uprights 25 and 26, upright frame members 37 and 38 and the integrated cross members 39 and 40 which surround an open interior 53 of the chair back 18 so as to define the visual appearance of an annular or peripheral back frame 36.

Preferably, the second mold shot also includes the formation of the intermediate web 42 extending crosswise between the upright frame members to form a lumbar support structure or support pad which is located in the open interior 53 and is spaced vertically from the upper and lower cross members or frame sections 39 and 40 to define open portions 53A and 53B. The upright frame sections 37 and 38 and horizontal cross members 39 and 40 have a greater thickness and are less flexible so as to support loads on the chair back generated by the chair occupant.

After the second shot is completed, third and fourth mold shots are performed, preferably at the same time, although the shots are considered to be separate since they form different structures of the chair back. As such, the third and fourth mold shots also may be performed sequentially.

More particularly, the material for shot three is the same as the mold material for shot number two to ensure chemical bonding with the material of the second mold shot. The third shot (FIGS. 20-24) encapsulates the vertical and horizontal frame sections 37-40 to define the final, finished surfaces for these structures. The inner boundary 55 of the third shot on the front and back frame sides is essentially the same and does not extend inwardly beyond the peripheral back frame 36 into the interior region 53 of the back which interior region 53 would remain open. However, the fourth shot encloses this interior region as discussed below.

In particular, the fourth shot (FIGS. 25-28) forms a thin sheet in the interior region extending from the inner boundary of the third shot encapsulating the vertical and horizontal frame structures 37-39. The fourth shot essentially defines a relatively thin, sheet-like suspension structure or interior panel 44 that encloses the open interior 53, encapsulates the intermediate web 42 on the front side and provides a support region which has greater flexibility in comparison to the frame structure.

By providing multiple mold shots to form different areas of the chair back 18, different performance characteristics are generated including the provision of a peripheral frame 36 providing structural rigidity to the chair back 18, a lumbar support panel 42 which uses the intermediate web to provide localized support to the lumbar region of the chair occupant, and a thin sheet-like panel 44 extending between the frame 36 and enclosing the interior region 53 defined between the peripheral frame 36 to provide a more flexible and pliant surface in contact with the occupant's back.

Figure 29:
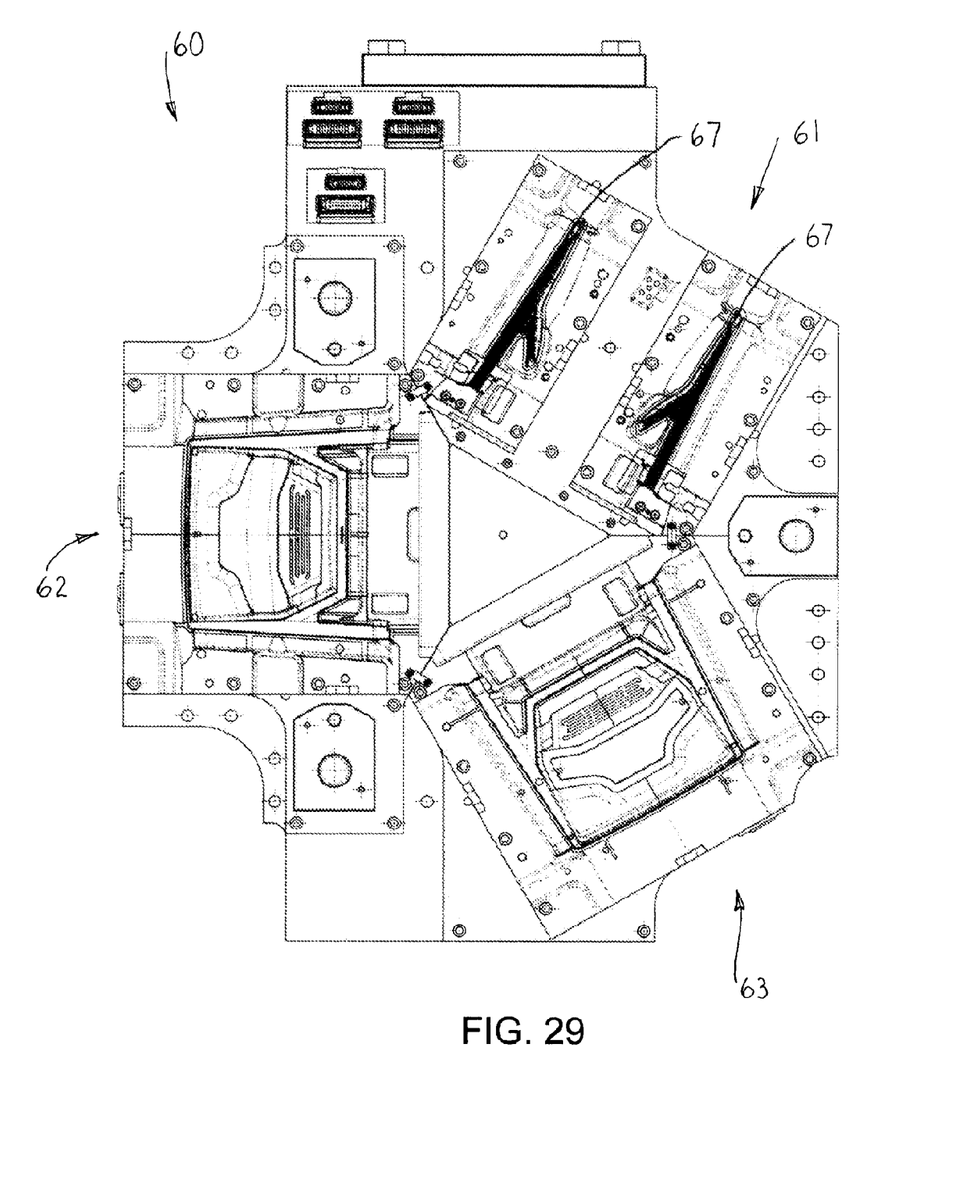
FIG. 29 is a plan view of a 3-station molding tool for constructing the chair back.
Figure 30:
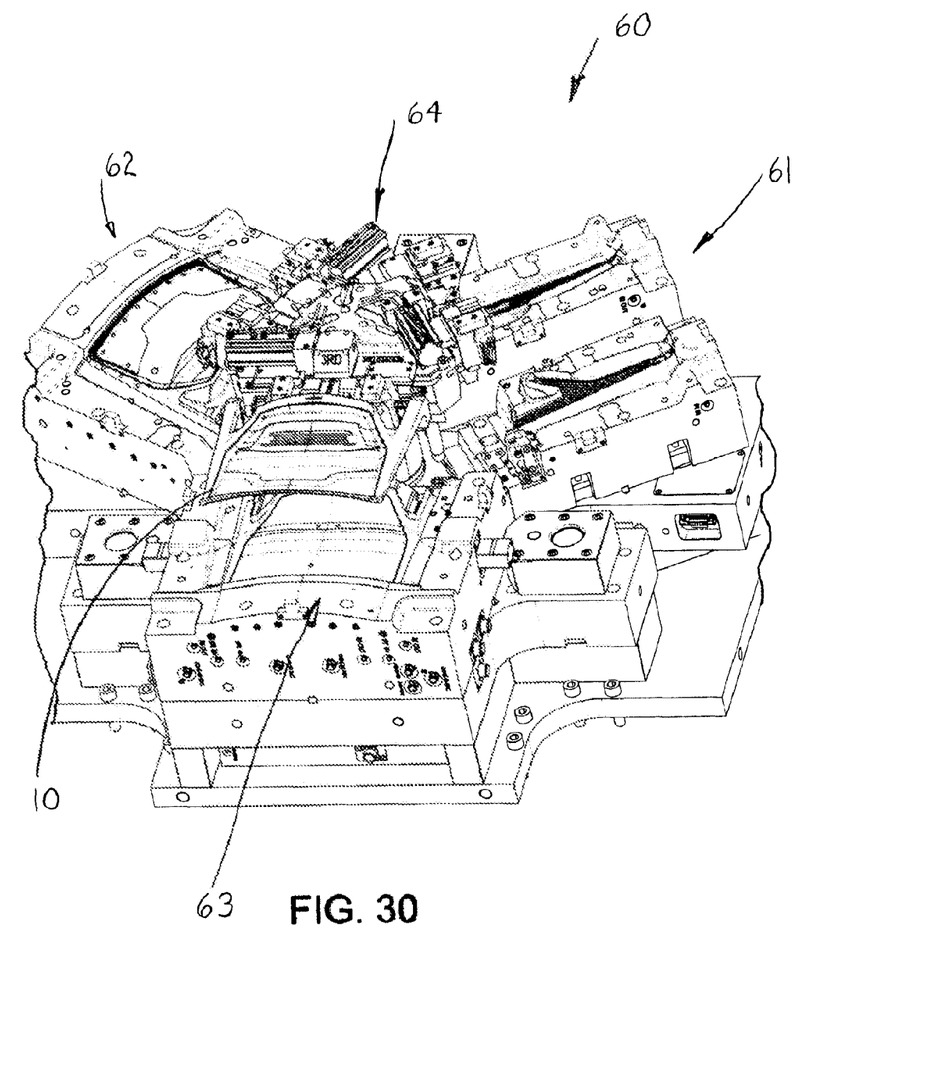
FIG. 30 is a perspective view thereof.

Referring to FIGS. 29 and 30, the multi-shot molding process preferably uses a three station injection molding tool 60 having a first station 61 for the first shot, a second station 62 for the second shot, and a third station 63 for the third and fourth shots which preferably occur simultaneously. The three stations 61-63 preferably are at a 120 degree offset. The molding tool 60 also includes a rotary pick and place unit 64 for moving the intermediate stage back components 120 degrees from one station to the other for construction of the back frame 10, and then final removal of the completed back frame 10. The molding tool 60 is a lift and rotate multi-shot tool on a multi barrel press which injects different materials for some of the mold stages. Each of the three stations has the same cycle time covering both injection or fill time and then a period of time for cooling before the mold opens and the components are rotated into and out of the stations. As such, at the end of each cycle time, one part is completed and removed while two other chair backs are at different stages of manufacture. It also is possible to use four separate tools to accomplish the mold shots.

The following further describes the molding process. As to the first mold shot of FIGS. 10-13, the upright core members 49 and 50 are formed in the first molding station 61 (FIGS. 29 and 30) within separate mold cavities 67. Prior to molding, the reinforcement plates 35 are robotically positioned in the mold cavities 67 for subsequent overmolding thereof when forming the connector legs 27 and 28. Then, the first mold shot is performed wherein the mold material preferably is a 33% glass filled nylon or other similar structurally rigid, moldable material which is able to withstand loads expected during use.

The core member 49 and 50 comprise a main body 80 which extends vertically and has a forward extension 81 at the bottom that is overmolded onto the steel plates 35 and forms the ribs 32 and bores 33 and 34 (FIGS. 8 and 9). The forward extension 81 also has additional channels 82 and 83 formed therein (FIG. 8) to assist in the connection of additional material layers thereto and increase the rigidity of the forward extension 81.

The top of the main body 80 includes an arcuate nose 84 that defines the rearward curvature of the top frame member 39, and an intermediate connector arm 85 that defines the start of the bottom frame section 40. This connector arm 85 rigidifies the joint with the frame section 40 and defines the shape of two angled frame portions 40A (FIG. 4). The front and rear faces of the core members 49 and 50 also are covered with patterns of parallel front ribs and grooves 86 and rear ribs and grooves 87 which overmolded in later mold shots. These ribs/grooves 86 and 87 provide strength and improve bonding to the subsequent mold layers.

After completion of shot one, the core members 49 and 50 and moved to the second mold station 62 for the second shot. In this second shot (FIGS. 14-19), the core members 49 and 50 are overmolded with the second material which preferably is 10% glass filled polypropylene. This second shot forms a second material layer 90 (FIG. 16) which fills the ribs/grooves 86 and 87 and rear sides of the core members 49 and 50 although portions of the core members may remain exposed.

The second mold shot thereby builds up the material of the vertical or upright frame sections 37 and 38 and also forms the upper cross member 39 which extends horizontally between the noses 84, and forms the lower cross member 40 which covers the connector arms 45 and then extends therebetween. This second mold shot generally forms the annular frame 36 for the chair back 18 that is defined by the overmolded uprights 25 and 26, upright frame members 37 and 38 and the integrated cross members 39 and 40 which surround the open interior 53 of the chair back 18.

In the upper corners of the frame 36, the second mold shot forms a thin frame panel 92 which has enlarged corner sections 92A and a center section 92B and extends downwardly from a curved flange 39A of the cross member 39. this thin frame panel 92 provides a thickness transition extending downwardly from the top cross member 39 to the open area 53A in which the support panel 44 will be formed where the thickness of the frame panel 92 is greater at the flange 39A and progressively decreases or thins in the downward direction.

The intermediate web 42 extends crosswise between the upright frame members to form a lumbar support structure. The back surface 42A of the web 42 also includes shallowed channels 42B which are parallel to each other and extend horizontally. Preferably, the web 42 is thicker in the middle and has a thickness of about 2 mills and thins or feathers down toward the opposite sides thereof. The thickness of the second layer 90 is about 2 mill although the thickness can vary.

As such, the second shot forms various frame structure and functional components of the chair back 18. These structural components provide more significant load bearing to the upper frame structure 36.

To finish the chair back 18, the third and fourth mold shots are performed by overmolding additional areas of the frame structure 36 with a mold material or materials that chemically bond to the second shot material described above. In the preferred embodiment, the third and fourth shot materials are olefin based materials that chemically bond with the second shot material, namely the glass filled polypropylene. In particular, the third shot material is selected to be the same as the shot two material, namely a 10% glass filled polypropylene, and is drawn from the same injection barrel in the production press 60. The fourth shot material preferably is selected as a 70 Shore A TPE which provides suitable performance characteristics including chemical bonding with the shot two and shot three materials, wear resistance, a softer texture, and selectable color. The third and fourth shots define the exposed surfaces of the chair back 18 and the color thereof can be selected to closely match or contrast with each other as desired.

The third shot (FIGS. 20-24) defines a material layer 95 that encapsulates the vertical and horizontal frame sections 37-40 to define the finished layer 95 that defines the final, finished surfaces for these frame structures. The inner boundary 55 of the third shot is essentially the same on the front and back frame sides (FIG. 22) and does not extend inwardly beyond the peripheral back frame 36 into the interior region 53 of the back which interior region 53 would remain open without the fourth shot. FIGS. 20-24 show the layer 95 in variations, with it being understood that the boundary 55 defines annular shut off lines separating the third and fourth shots.

Figure 6:
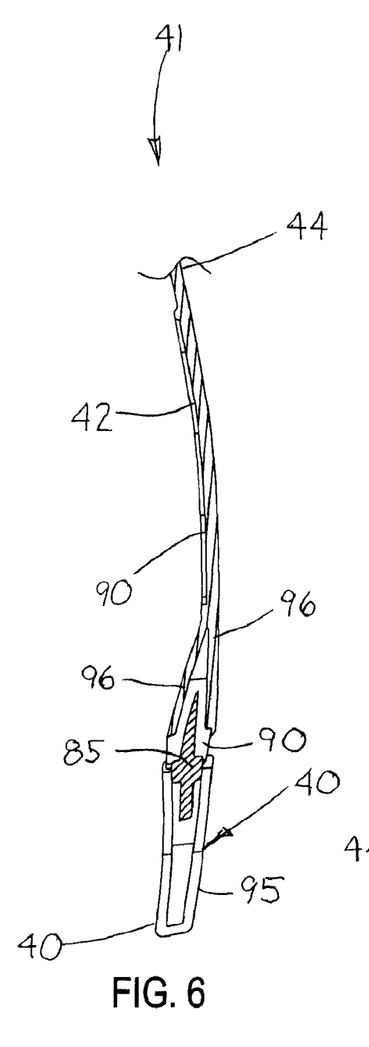
FIG. 6 is a partial cross sectional view as taken along the line 6-6 of FIG. 5.
Figure 7:
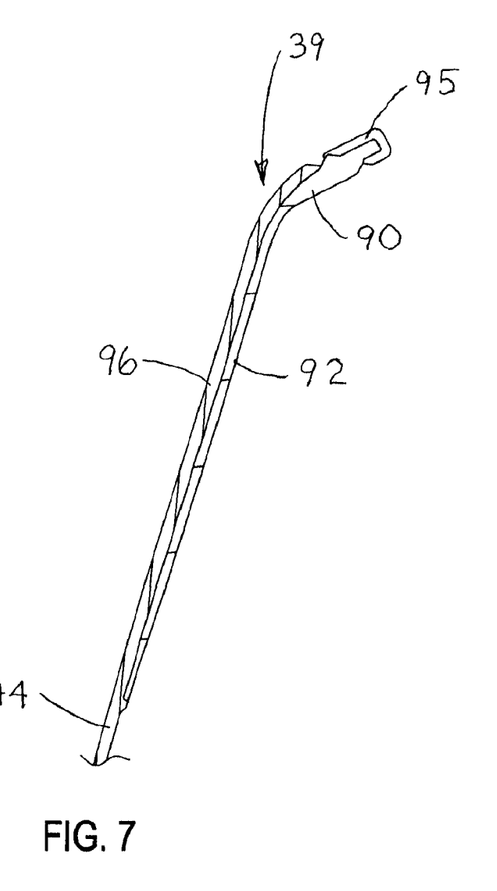
FIG. 7 is a partial cross sectional view as taken along line 7-7 of FIG. 5.

The fourth shot (FIGS. 25-28) preferably is injected simultaneously with the third shot in station 63 to form a thin sheet 96 in the interior region extending from its boundary 96A-D to the inner boundary 55A-D of the third shot. The fourth shot essentially defines a relatively thin, sheet-like suspension structure or interior panel 44 that encloses the open interior 53, encapsulates the intermediate web 42 on the front side (FIG. 6) and provides a support region which has greater flexibility in comparison to the frame structure.

At the end of the third and fourth shots, the rotary unit 64 picks the completed chair back 18 and removes same from the last station 63. At the same time, the unit 64 also moves the core members 49 and 50 from the first station 61 to station 62, while moving the intermediate frame structure 36 from station 62 to station 63. As a result, an improved manufacturing process is employed to construct the chair back 18, wherein the chair back 18 also has improved performance characteristics.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A manufacturing process for forming a chair back with a molding operation wherein said chair back has a generally rectangular shape and integrally includes two, downwardly projecting uprights which are configured to pivotally connect to a chair structure, said uprights rigidly supporting the chair back along the opposite left and right side edges thereof, and said chair back further comprising a sheet-like support panel extending between the uprights at the side edges, which said support panel is vertically enlarged and configured to support the chair back of the occupant, the method comprising the steps of:

performing a first mold shot to construct right and left structural components as a first step in forming a back frame, said left and right uprights providing structural rigidity to the left and right sides of the back frame;

performing a second mold shot wherein the left and right uprights are overmolded with a second material to build up an overmolded layer on the left and right sides of said back frame to form vertical left and right frame sections as well as form upper and lower integrated cross members extending between said left and right frame section, said second mold shot generally forming an annular shape for said back frame that is defined by the overmolded uprights and the integrated cross members which surround an open interior of the chair back;

after the second mold shot is completed, performing third and fourth mold shots wherein said third mold shot forms an encapsulating wall around the left and right frame sections and the upper and lower cross members to define a finished surfaces for these structures, and said fourth mold shot forms a thin sheet across the open interior which said thin sheet extends from an inner boundary of the third shot, said thin sheet of said fourth shot defining a relatively thin, sheet-like interior panel that encloses the open interior, and provides a support region which has greater flexibility in comparison to the back frame.

2. The method according to claim 1, wherein an inner boundary of the third shot does not extend inwardly beyond the peripheral back frame into the open interior of the back frame which interior region would remain open except that the fourth shot encloses this interior region.

3. The method according to claim 2, wherein the second mold shot also includes the formation of an intermediate web extending crosswise between the upright frame members to form a lumbar support structure which is located in the open interior.

4. The method according to claim 3, wherein said thin sheet of said fourth shot encloses the open interior, and encapsulates the intermediate web.

5. The method according to claim 1, wherein the mold material for the third mold shot is the same as the mold material for the second mold shot to ensure chemical bonding with the material of the second mold shot.

6. The method according to claim 1, wherein said right and left structural components are formed as generally L-shaped uprights that are sufficiently rigid so as to pivotally connect to the chair structure.

7. The method according to claim 1, wherein the overmolded uprights and the integrated cross members which surround an open interior of the chair back define the visual appearance of an annular or peripheral back frame.

8. The method according to claim 1, wherein said method defines different performance characteristics in the chair back, and the chair back has the appearance of a unitary molded panel, but is formed from multiple said mold shots which are performed at multiple stations on a mold tool.

9. The method according to claim 1, wherein said upright frame sections and integrated cross members have a greater thickness and are less flexible in comparison to said interior panel so as to support loads on the chair back generated by the chair occupant.

10. The method according to claim 1, wherein said third and fourth mold shots are performed at the same time.

11. The method according to claim 1, wherein said third and fourth mold shots are performed sequentially.

* * * * *